(12) United States Patent
Ehrmann et al.

(10) Patent No.: US 11,485,534 B2
(45) Date of Patent: Nov. 1, 2022

(54) PACKAGING MACHINE HAVING AN IMPROVED ADJUSTMENT FUNCTION

(71) Applicant: Multivac Sepp Haggenmüller SE & Co. KG, Wolfertschwenden (DE)

(72) Inventors: Elmar Ehrmann, Bad Grönenbach (DE); Claus Botzenhardt, Kempten (DE); Christian Lau, Heimenkirch (DE); Natalie Schmid, Sonthofen (DE); Florian Felch, Durach (DE); Thorsten Remmele, Westernheim (DE)

(73) Assignee: MULTIVAC SEPP HAGGENMÜLLER SE & CO. KG, Wolfertschwenden (DE)

( * ) Notice: Subject to any disclaimer, the term of this patent is extended or adjusted under 35 U.S.C. 154(b) by 427 days.

(21) Appl. No.: 15/750,368

(22) PCT Filed: Aug. 8, 2016

(86) PCT No.: PCT/EP2016/068896
§ 371 (c)(1),
(2) Date: Jun. 25, 2018

(87) PCT Pub. No.: WO2017/021556
PCT Pub. Date: Feb. 9, 2017

(65) Prior Publication Data
US 2018/0297730 A1    Oct. 18, 2018

(30) Foreign Application Priority Data

Aug. 6, 2015   (DE) .................. 10 2015 214 992.7

(51) Int. Cl.
*B65B 57/00* (2006.01)
*B29C 51/46* (2006.01)
(Continued)

(52) U.S. Cl.
CPC .............. *B65B 57/00* (2013.01); *B29C 51/46* (2013.01); *B29C 65/18* (2013.01);
(Continued)

(58) Field of Classification Search
None
See application file for complete search history.

(56) References Cited

U.S. PATENT DOCUMENTS

| | | | |
|---|---|---|---|
| 4,691,496 A | 9/1987 | Anderson et al. | |
| 5,479,756 A * | 1/1996 | Haze | B65B 57/00 340/3.2 |

(Continued)

FOREIGN PATENT DOCUMENTS

| | | |
|---|---|---|
| CN | 201566855 U | 9/2010 |
| CN | 102372100 A | 3/2012 |

(Continued)

*Primary Examiner* — Chinyere J Rushing-Tucker
(74) *Attorney, Agent, or Firm* — Husch Blackwell LLP

(57) ABSTRACT

An apparatus comprising a packaging machine, which comprises a control unit having a process parameter generator designed to determine specific process parameters for a production process of the packaging machine. The control unit of the packaging machine also comprises a recipe generator for an adjustment process of the packaging machine preceding the production process or can be connected to a recipe generator of the apparatus, which generator is designed as a separate unit. The respective recipe generator comprises a set of rules for determining recipe variables for the adjustment process of the packaging machine and is designed to generate the recipe variables with reference to a plurality of data and to form therefrom a recipe data set for the adjustment process of the packaging machine. A method for using the apparatus is also included.

13 Claims, 2 Drawing Sheets

(51) Int. Cl.
  B65B 47/02    (2006.01)
  B65B 9/04     (2006.01)
  B29C 65/18    (2006.01)
  B29C 65/00    (2006.01)
  B65B 31/02    (2006.01)
  B65B 51/10    (2006.01)
  G05B 19/042   (2006.01)
  B65B 51/14    (2006.01)
  B29L 31/00    (2006.01)

(52) U.S. Cl.
  CPC ...... *B29C 66/00145* (2013.01); *B29C 66/112* (2013.01); *B29C 66/131* (2013.01); *B29C 66/53461* (2013.01); *B29C 66/81455* (2013.01); *B29C 66/82421* (2013.01); *B29C 66/83221* (2013.01); *B29C 66/849* (2013.01); *B29C 66/9121* (2013.01); *B29C 66/9141* (2013.01); *B29C 66/924* (2013.01); *B29C 66/9221* (2013.01); *B29C 66/9231* (2013.01); *B29C 66/92443* (2013.01); *B29C 66/92921* (2013.01); *B29C 66/944* (2013.01); *B29C 66/953* (2013.01); *B65B 9/04* (2013.01); *B65B 31/022* (2013.01); *B65B 47/02* (2013.01); *B65B 51/10* (2013.01); *G05B 19/0426* (2013.01); *B29L 2031/712* (2013.01); *B65B 51/14* (2013.01); *B65B 2051/105* (2013.01); *G05B 2219/23012* (2013.01); *G05B 2219/45048* (2013.01)

(56) References Cited

U.S. PATENT DOCUMENTS

| | | | |
|---|---|---|---|
| 6,814,905 B1 * | 11/2004 | Dalgewicz | B29C 51/14 264/37.32 |
| 7,784,469 B2 | 8/2010 | De Pietra et al. | |
| 2002/0051833 A1 | 5/2002 | Shiozaki | |
| 2005/0039420 A1 | 2/2005 | Albritton et al. | |
| 2008/0152767 A1 | 6/2008 | Maisel | |
| 2008/0172986 A1 * | 7/2008 | Theurer | G05B 19/188 53/284.7 |
| 2011/0202157 A1 * | 8/2011 | Spikker | B01F 13/1066 700/96 |
| 2012/0204516 A1 * | 8/2012 | Palumbo | B65B 11/52 53/403 |
| 2013/0152507 A1 | 6/2013 | Frazier et al. | |
| 2014/0109511 A1 | 4/2014 | Hammad | |
| 2014/0223863 A1 * | 8/2014 | Lancaster, III | B65B 11/008 53/436 |
| 2015/0353220 A1 * | 12/2015 | Lancaster, III | B65B 57/18 53/461 |
| 2015/0378352 A1 * | 12/2015 | Wetsch | B65B 57/145 700/97 |

FOREIGN PATENT DOCUMENTS

| | | | | |
|---|---|---|---|---|
| CN | 103930349 A | | 7/2014 | |
| CN | 203845103 U | | 9/2014 | |
| CN | 104554910 A | | 4/2015 | |
| DE | 7345840 U | | 11/1977 | |
| DE | 3739432 A1 | | 6/1989 | |
| DE | 19735942 A1 | | 3/1999 | |
| DE | 102005059312 A1 | | 6/2007 | |
| DE | 102006040807 A1 | | 3/2008 | |
| DE | 102006050417 A1 | | 4/2008 | |
| DE | 102008024461 A1 | | 12/2009 | |
| DE | 102009017638 A1 | | 10/2010 | |
| DE | 102009040977 A1 | | 3/2011 | |
| DE | 202010017361 U1 | | 12/2011 | |
| DE | 102012004341 A1 | | 9/2013 | |
| DE | 102012005179 A1 | * | 9/2013 | ............ B29C 51/46 |
| DE | 102012005179 A1 | | 9/2013 | |
| DE | 102012005912 A1 | | 9/2013 | |
| DE | 102013105548 A1 | | 12/2014 | |
| EP | 1225491 A1 | | 7/2002 | |
| EP | 1316002 A1 | | 6/2003 | |
| EP | 1710074 A1 | | 10/2006 | |
| EP | 1818159 A2 | | 8/2007 | |
| EP | 1935787 A1 | | 6/2008 | |
| EP | 2252921 A1 | | 11/2010 | |
| EP | 2415677 A1 | | 2/2012 | |
| EP | 2690023 A1 | | 1/2014 | |
| EP | 2722279 A1 | | 4/2014 | |
| JP | 04138504 A | | 5/1992 | |
| WO | 0019278 A1 | | 4/2000 | |

* cited by examiner

PACKAGING MACHINE HAVING AN IMPROVED ADJUSTMENT FUNCTION

BACKGROUND OF THE INVENTION

In practice, packaging machines are frequently preprogrammed before the actual production process to be carried out therewith, i.e. before specific products can be packed according to orders, by means of great efforts during an adjustment process carried out in advance with a plurality of product and machine dependent process data. Thereby, often several test runs are required in order to determine the optimal process data. Due to the plurality of required process data, often only skilled machine adjusters can carry out the adjustment process on the packaging machine.

Specifically, if a new product, a new film or a new tool are used on the packaging machine for the first time, a program (recipe) with suitable machine adjustments (parameters) does not yet exist therefor. For the operators, it is often impossible and even for a machine adjuster, it involves a considerable effort to create a program on the packaging machine for the new product, the new packaging material, and/or the new tool used therefor so that a process-reliable production can start according to changed parameters.

Document DE 10 2012 005 179 A1 discloses an apparatus as well as a method for operating the apparatus for a molding process of a heated thermoplastic film. Thereby, a control unit of the apparatus supplies a controller with machine adjustments controlling a thermoforming process as first input values, determines measurement values from the thermoforming process, and supplies the controller with the measurement values as second input values, and the operator supplies the controller with inputs as third input values via the operating input interface HMI, wherein the controller processes the first, second, and third input values and supplies the control unit with the controller results as adapted machine adjustments.

SUMMARY OF THE INVENTION

It is an object of the invention to provide a packaging machine having an improved adjustment function as well as a method therefor. It is in particular also an object to facilitate the development of the ready program for the operating personnel with the first adjustment of the packaging machine.

The apparatus according to the invention comprises a packaging machine having a control unit with a process parameter generator which is configured to determine specific process parameters for a production process of the packaging machine.

According to the invention, the control unit of the packaging machine further comprises a recipe generator for an adjustment process of the packaging machine preceding the production process or can be connected to a recipe generator of the apparatus which generator is designed as a separate unit, wherein the respective recipe generator comprises a set of rules for determining recipe variables for the adjustment process of the packaging machine. Further, the recipe generator is designed to generate the recipe variables with reference to a plurality of data, in particular by means of data relating to the product to be produced, to a packaging type therefor, to at least one used tool of the packaging machine, to a label to be applied and/or to a film material, and to form therefrom a recipe data set for the adjustment process of the packaging machine. The process parameter generator according to the invention is further designed to pre-allocate the control unit with specific process parameters for the production process of the packaging machine which at least partially are based on the recipe variables of the recipe data set respectively generated for the adjustment process. The invention inter alia is advantageous to reduce changeover times of the machine.

In the invention, the recipe generator may be designed as autonomous component of the control unit or as separately configured autonomous module, i.e. as physically separate unit for functionally connecting the control unit. In the latter embodiment, the recipe generator preferably can be functionally connected to the control unit by means of a web-based application.

Specifically, the recipe data set in this regard may be used universally for many machines which are equipped in technically different manners. After accepting the recipe data set, the individual machine may be adjusted individually thereto by means of the process generator.

In both variants, the recipe generator is primarily used in the adjustment process of the packaging machine, i.e. temporally seen before the actual production process. The aim of the adjustment process is an optimal pre-allocation of the control unit with the process parameters, i.e. conducting an optimal parameterization of the control unit.

In the invention, from easily accessible data, professional recipe variables, preferably supplemented many times by means of the recipe generator by using the set of rules installed thereon may be generated which may be supplied as input values to the process parameter generator which generates therefrom specific process parameters. These may be used for pre-allocating the control unit, i.e. in particular as target reference values of the control unit in a preferred process data based control circuit during the production process.

The recipe variables may preferably be determined by means of a set of rules formed from expert knowledge and pre-programmed in the recipe generator. The set of rules preferably comprises mathematical formulas and/or data sets by means of which recipe variables required for the production process can be determined. Preferably, the respective formulas of the set of rules are designed for the shortened designation of a mathematical, physical and/or chemical fact, relation or rule for the target production process.

In the invention, the recipe generator can be used as intelligent adjustment aid during the adjustment process, since the set of rules already pre-programmed thereon may determine a plurality of recipe variables which otherwise without the recipe generator would individually have to be entered manually by the machine adjuster for establishing a program for the production process into the control system of the packaging machine.

After the recipe variables are produced by the recipe generator, these may be used within an arbitrary time frame thereafter, however, in this case in a process-related manner by the process parameter generator for the production of the process parameter by means of which the control unit can be pre-allocated for the production process.

The invention is primarily advantageous for the adjustment process of the packaging machine which takes place in a process preceding the actual production process. In the invention, the main function of the recipe generator is intended for the adjustment process, i.e. that its use for calculating the recipe variables is independent of a control system of the actual production process which is preferably process data-based by means of the control unit. The production of the recipe variables by means of the recipe generator namely may take place in an isolated manner, i.e. autonomously, as step in the scope of the production planning of the adjustment process without being involved into a process-related control circuit of the production process.

In other words, the recipe generator in the invention is configured to generate in advance from easily obtainable data passed on to it during the adjustment process a general recipe from recipe variables which are available chronologically offset for the control unit for the production of process parameters to be pre-allocated.

Preferably, the recipe generator being designed as separate unit is functionally integrated in a server or cloud system and can be connected to the control unit for the adjustment process, in particular to the process parameter generator of the control unit of the packaging machine.

It is also preferred if the recipe generator being configured as separate unit has access to an external database which comprises the server or cloud system, i.e. is preferably web-based integrated in the server or cloud system.

Preferably, the control unit of the packaging machine itself comprises a database for providing, calculating and/or supplementing the data for the recipe generator. Preferably, the database comprises several partitions, in particular a product database, a packaging type database, a packaging material database, a tool database and/or a label database, wherein the respective partitions are designed to generate additional data from the data retrieved as input values and/or to pass it on directly to the recipe generator.

Preferably, the packaging machine comprises an HMI interface at which the data can be directly retrieved for the recipe generator and/or for the database matching by an operator and/or can be entered. According to an embodiment, the HMI interface of the packaging machine offers a correction function by means of which individual recipe variables and/or process parameters can be corrected and/or supplemented by the operator.

Preferably, the packaging machine comprises a reading device being designed as RFID scanner which is configured to read the data for generating the recipe variables from an RFID chip placed on the product, the packaging material, the tool, the label and/or the film material and to pass it on to the recipe generator.

Preferably, data relating to the product can be an item number, a product name, a product type and/or a function process, in particular a packaging process. For example, the operator intends to package a moist product by means of Modified Atmosphere Packaging (MAP), e.g. pork sausage. By means of entering an insertion temperature and if appropriate, by means of additional data from a database connected to the recipe generator, in particular the product database, the recipe generator can generate a value proposition for a maximum product vacuum which can be calculated from a vapor pressure curve stored on the database specifically for the product and from the set of rules predetermined on the recipe generator from the expert knowledge.

For example, for the adjustment process, specific products can be chosen by an operator, which require special processes relating to their specific properties. Thus, for example, for meat or cheese products with air pockets (e.g. meat loaf and Tilsit cheese) there are specific processes (e.g. a "meat loaf" and/or a "Tilsit cheese" program) which prevent a damage of the product during the evacuation process. For example, by the mere selection of such a product, the recipe generator may be provided with relating product properties from the product database so that said recipe generator determines a gradual evacuation and/or a slow/soft evacuation as recipe variable for the recipe data set so that the air pockets may diffuse slowly out of the product.

For example, data relating to the packaging could be an entry of packaging dimensions, whereby by means of the recipe generator a degree of deformation of the film could be determined and, thus, a theoretical remaining film thickness. In this regard, the recipe generator may comprise a rule for the generation of a minimum cooling time, wherein this fulfills the prerequisite that the greater the surface and the smaller the remaining film thickness, the faster the thermal energy can flow off into the molding tool lower part, i.e. the smaller is the minimum cooling time.

For example, for an improved opening process for the consumer, a customer could demand a slightly convex packaging which preferably can be selected as general data related to the packaging type as an input value to the recipe generator and/or the packaging type database from which corresponding to the general data, a process value linked thereto can be forwarded to the recipe generator as data for producing the recipe variables. The operator could select the convex packaging demand, in particular at the HMI interface of the packaging machine. Based on this data, for the production process, the recipe generator can generate recipe variables for a controlled gassing for the production of a desired re-gassing pressure which lies above the atmosphere pressure.

For example, data relating to the used film material, a heating temperature window could be proposed by the recipe generator by a manual input or automatic reading (e.g. via RFID or barcode) of the film type (kind of material, film thickness and/or producer) by including the stored film database. Said heating temperature window may additionally be adapted by the set of rules of the recipe generator based on expert knowledge, preferably relating to a specific heating process and/or specific rules for a maximum energy input.

For example, a lower film with 300 micrometers could be used so that in a "standard molding process" by including the rule of 0.6 seconds per 100 micrometers, a heating time of 1.8 seconds results and in case of the simple "sandwich preheating" by including the rule 0.4 seconds per 100 micrometers, a heating time of 1.2 seconds is proposed by the recipe generator.

For example, from data relating to a sealing tool used at the packaging machine, preferably by means of stored tool data, for example by means of readable data of an RFID tag placed thereon, a mechatronic tool and/or retrievable data from a tool database, an effective membrane surface of the used sealing tool as well as its sealing seam surface could be determined by means of the recipe generator. Together with a (by means of a film database) predetermined sealing surface force, the membrane generating a sealing force can be correspondingly applied with compressed air.

For example, data relating to the label could be selected such that the operator, preferably in a graphical surface of the HMI interface determines the label with imprint as well specifies how the label is supposed to be placed on the packaging. The recipe generator then could offer various regions and shapes according to which a labeling machine associated to the apparatus can be controlled.

A preferred variant provides that the control unit of the packaging machine comprises a recipe storage on which several recipe data sets generated for the adjustment process can be stored and are available for subsequent adjustment processes.

Preferably, the set of rules of the recipe generator is functionally changeable and/or expandable. Preferably, the set of rules can be updated via an update function relating to new expert knowledge.

Preferably, the packaging machine is a deep-drawing packaging machine comprising a molding station, and the recipe generator is provided with a rule for determining a heating time as recipe variable for preheating a lower film used for the production process, wherein the recipe generator by using the rule is designed to determine the heating time by means of the data concerning the film thickness of the lower film. For example, the rule for determining the heating time is that this corresponds to a given multiple (a fraction) of one second per 100 micrometers, in particular 0.5 seconds per 100 micrometers.

A preferred variant provides that the recipe generator has a rule for determining a molding time as recipe variable for molding the lower film, wherein the recipe generator by using the rule is designed to determine the molding time as a fraction of the heating time, in particular as a third of the heating time.

Especially, the packaging machine comprises a sealing station and the recipe generator a rule for determining a sealing temperature as recipe variable for producing a sealing seam, wherein the recipe generator by using the rule is designed to determine the sealing temperature based on a summarized film thickness of film sections to be sealed.

Preferably, the recipe generator comprises a rule for determining a sealing force as recipe variable for producing the sealing seam, wherein the recipe generator by using the rule is designed to calculate the sealing force as a product from a sealing pressure applicable at the sealing station and a sealing surface to be generated.

For a flexible operation, the process parameter generator is preferably designed to adapt the process parameters by means of a set of rules formed in the process parameter generator depending on the tool components used on the packaging machine.

The invention also relates to a method for generating a recipe data set for an adjustment process of a packaging machine, wherein a recipe generator of the packaging machine or a recipe generator which is designed as separate unit and can be functionally connected to the recipe generator generates a plurality of recipe variables of the recipe data set for the adjustment process of the packaging machine with reference to a plurality of data in particular with reference to data relating to the product to be produced, to a packaging type therefor, to at least one used tool of the packaging machine, to a label to be applied and/or to a film material. Further, a process parameter generator of the packaging machine generates specific process parameters from the recipe data set which at least partially are used for pre-allocating the control unit for a production process on the packaging machine.

Preferably, the process parameter generator calculates a specific process parameter for pre-allocating the control unit with a set of rules formed in the process parameter generator depending on at least one recipe variable of the recipe data set and at least one specific value of a tool component used on the packaging machine.

Other aspects and advantages of the present invention will be apparent from the following detailed description of the preferred embodiments and the accompanying drawing figures.

DESCRIPTION OF THE SEVERAL VIEWS OF THE DRAWING

In the following, an advantageous embodiment of the present invention will be explained in more detail making reference to a drawing, in which the individual figures show.

DETAILED DESCRIPTION OF THE INVENTION

Figure 1:
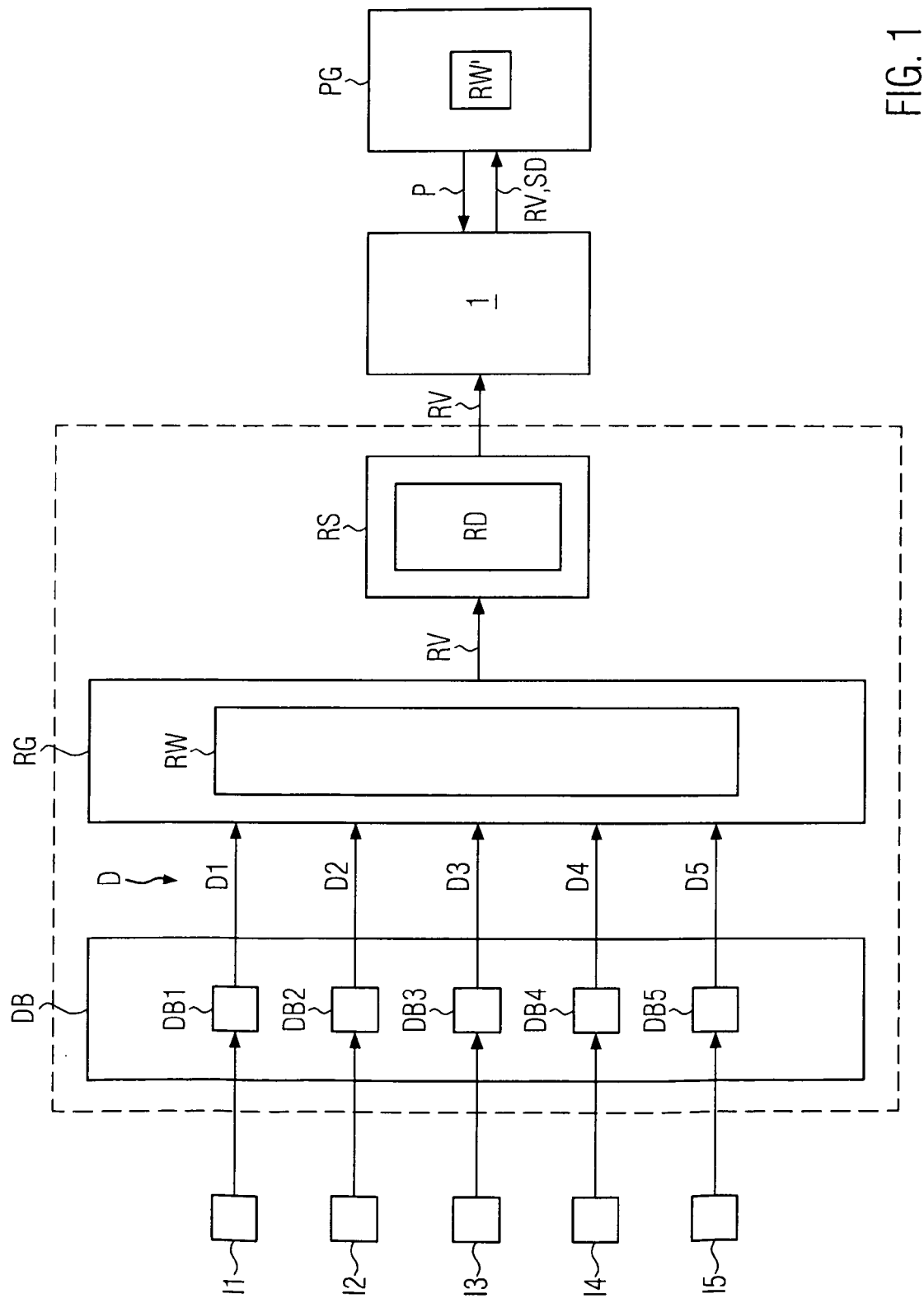
FIG. 1 is a schematic view of one embodiment of the invention in accordance with the teachings of the present disclosure.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention.

Other embodiments can be utilized and changes can be made without departing from the scope of the present invention. The present invention is defined by the appended claims and the description is, therefore, not to be taken in a limiting sense and shall not limit the scope of equivalents to which such claims are entitled.

Figure 2:
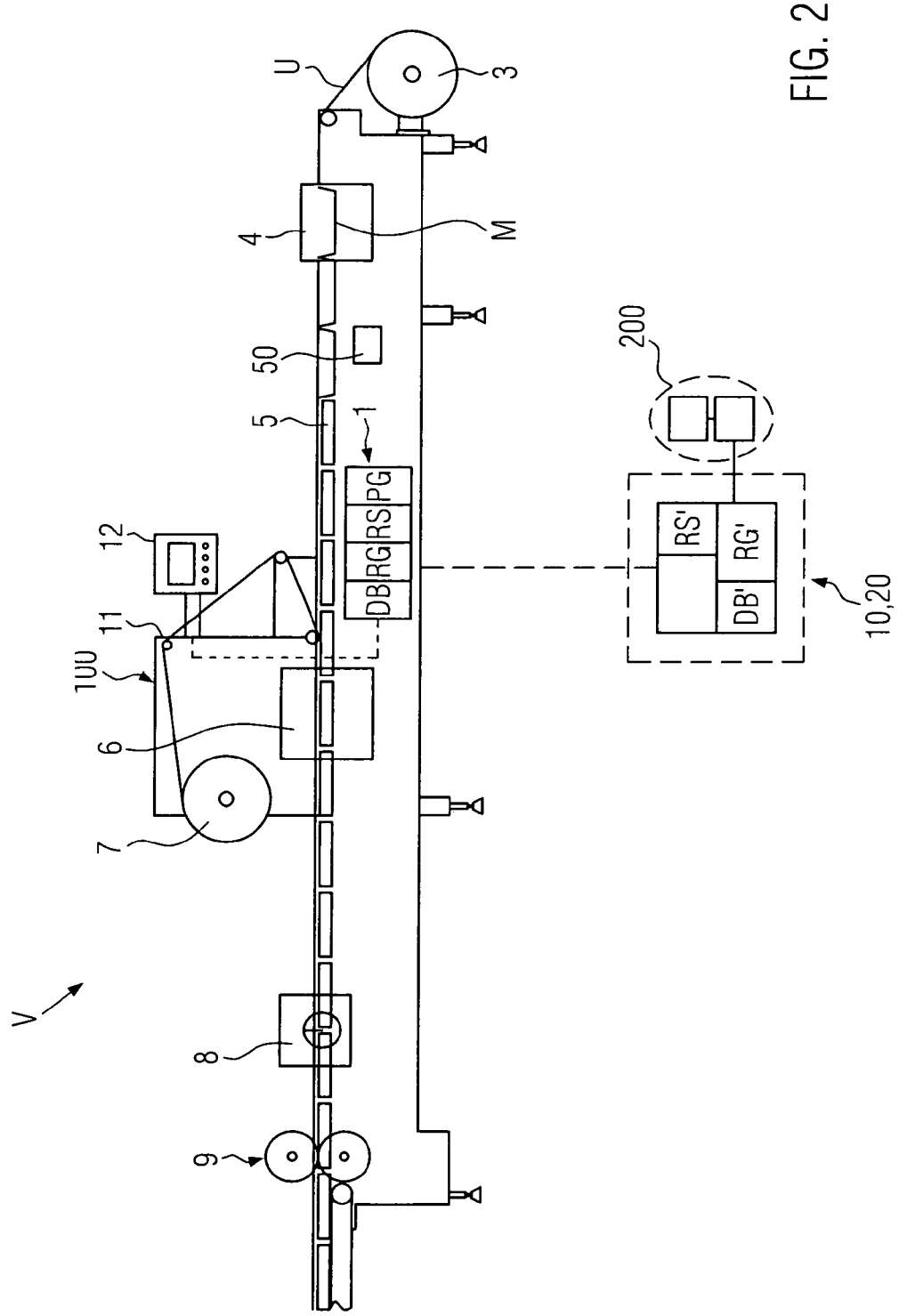
FIG. 2 is a schematic view of one embodiment of a deep-drawing packaging machine in accordance with the teachings of the present disclosure.

FIG. 1 shows in a schematic view a functional diagram for an adjustment process E of a packaging machine 100 shown in FIG. 2.

In adjustment process E, initially, data I, in particular product data I1, packaging type data I2, packaging material data I3, tool data I4, and label data I5 are retrieved by means of an RFID or HMI application or as data of a mechatronic tool on the packaging machine 100. The data I could also be retrieved on at least a PC 200 remote from the packaging machine 100 (see FIG. 2).

By selecting the data I, a corresponding access to the database DB occurs, in particular to database partitions DB1, DB2, DB3, DB4, and DB5 associated to the database DB. The respective database partitions DB1, DB2, DB3, DB4, and DB5 by means of the selected data I1, I2, I3, I4; and I5 are designed to send corresponding and/or supplementing data and/or data calculated therefrom to a recipe generator RG as input values. The recipe generator RG may be configured as a part in a control unit 1 associated to the packaging machine 100, on a server system 10 and/or in a cloud system 20.

The database DB may be configured as a part of the recipe generator RG, in particular in the server or cloud system 10, 20 and/or in the control unit 1. In the database DB, a plurality of raw data as well as data sets D are contained which can be activated according to the data input. The database DB thereby links the data I with the associated data D1, D2, D3, D4, D5 which correspond to the received data I1, I2, I3, I4, and I5 or are derived therefrom and which are made available to the recipe generator RG as input values. Thereby, the data D1, D2, D3, D4, D5 issued by the database DB are intended to be further processed by means of a set of rules provided on the recipe generator RG.

The recipe generator RG comprises the set of rules RW as own processor which is configured to calculate recipe variables RV as initial values of the recipe generator RG by means of rules, tables, formulas, algorithms, in particular statistical algorithms, and/or data sets. Thereafter, the recipe variables RV are stored as recipe data set RD in a recipe storage S. The recipe data set RD now forms a universal recipe comprising several provisional process data, wherein further specific process data, as described in the following, can be considered for pre-allocating the control unit 1 in order to optimally pre-allocate the control unit 1 for a production process H with appropriate process parameters so that in this regard, the packaging machine 100 can start the production process H.

For this purpose, the recipe data set RD can be retrieved from the storage S of the control unit 1. The control unit 1 transmits the recipe data set RD to the process parameter generator PG which preferably is associated to the control unit 1, wherein the control unit 1 further is configured to send specific machine, packaging, tool and/or product data SD to the process parameter generator PG which forms process parameter P as target values for pre-allocating the control unit 1 by means of a production process specific set of rules RW which is associated thereto.

FIG. 2 shows an apparatus V comprising a packaging machine 100 which is configured as deep-drawing packaging machine. The packaging machine 100 comprises an unwinding station 3 for a lower film U, a molding station 4 for production of packaging troughs M which are transported to a sealing station 6 by means of a conveyor unit 5, and a further unwinding station 7 for providing an upper film O which can be sealed in the sealing station 6 to a provided packaging trough P. Further, the packaging machine 100 comprises a labeling machine 8 and a separation unit 9.

An HMI interface 12 is arranged at a machine frame 11 of the packaging machine 100. At the HMI interface 11, an operator can select the data I described above in connection with FIG. 1.

FIG. 2 also shows that the packaging machine 100 comprises a control unit 1. The control unit 1 according to FIG. 2 comprises the recipe generator RG, the database DB, the process parameter generator PG as well as the recipe storage RS.

The packaging machine 100 further comprises a reading device 50 being designed as an RFID scanner which is configured to read the data I for generating the recipe variables RV from a not shown RFID tag placed on the product, the packaging material, the tool, the label and/or the film material and to pass it on to the recipe generator RG.

Further, FIG. 2 illustrates an alternative application in which a recipe generator RG' is configured together with a recipe storage RS' and a database DB' locally separated from the packaging machine 100 as a separate unit. This can be functionally integrated in the server or cloud system 10, 20, wherein by means of the PC 200, an activation of the recipe generator RG' as well as production of the process parameter by means of the process parameter generator PG' can be carried out. The recipe generator RG' then can transfer the produced process parameter to the control unit 1. It is also feasible that by means of the PC 200, the recipe generator RG formed in the control unit 1 can be controlled.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention.

As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

The invention claimed is:

1. An apparatus comprising:
a packaging machine comprising a control unit having a process parameter generator for determining one or more process parameters for a production process of the packaging machine, and a recipe generator for an adjustment process of the packaging machine, wherein the recipe generator is one of (a) a part of the control unit of the packaging machine, or (b) as a separate unit in communication with the control unit;
wherein the respective recipe generator comprises a first set of rules for determining one or more recipe variables for the adjustment process of the packaging machine and generates the one or more recipe variables with reference to a plurality of data, said plurality of data comprising at least one or more of: a product to be packaged, two or more tools of the packaging machine, or a label to be applied;
the recipe generator forms a recipe data set for the adjustment process of the packaging machine from the plurality of data, and wherein the process parameter generator is designed to pre-allocate the control unit with the one or more process parameters for the production process of the packaging machine which at least partially are based on the recipe variables of the recipe data set respectively generated for the adjustment process;
wherein the recipe generator calculates the recipe variables independently of a process-related control system of the production process; and
wherein the process parameter generator adapts the one or more process parameters using a second set of rules formed in the process parameter generator depending on two or more tool components used on the packaging machine.

2. The apparatus according to claim 1, wherein the recipe generator is a separate unit and is functionally integrated in a server or cloud system and can be connected to the process parameter generator of the control unit of the packaging machine for the adjustment process.

3. The apparatus according to claim 2 wherein the recipe generator has access to an external database which comprises the server or cloud system in order to retrieve data stored therein for the recipe generator.

4. The apparatus according to claim 1, wherein the control unit of the packaging machine comprises a database for providing data and the packaging machine comprises an HMI interface at which the data is retrieved for the recipe generator of the control unit by an operator.

5. The apparatus according to claim 4, wherein the HMI interface of the packaging machine comprises a correction function to allow the operator to one of correct or supplement at least one of the one or more recipe variables and the one or more process parameters.

6. The apparatus according to claim 1, wherein the packaging machine comprises a reading device being designed as RFID scanner which is configured to read the data for generating the one or more recipe variables from an RFID chip placed on the product, a packaging material, the two or more tools, the label and/or a film material and to pass it on to the recipe generator.

7. The apparatus according to claim 1, wherein the control unit of the packaging machine comprises a recipe storage on which several recipe data sets generated for the adjustment process can be stored and are available for subsequent adjustment processes.

8. The apparatus according to claim 1, wherein the first set of rules of the recipe generator is functionally changeable and/or expandable.

9. The apparatus according to claim 1, wherein the packaging machine is a deep-drawing packaging machine comprising a molding station, and the recipe generator is provided with a rule for determining a heating time as one of the one or more recipe variables for preheating a lower film used for the production process, wherein the recipe generator by using the rule determines the heating time using the data concerning a film thickness of the lower film.

10. The apparatus according to claim 9, wherein the recipe generator has a rule for determining a molding time as one of the one or more recipe variables for molding the lower film, wherein the recipe generator by using the rule determines the molding time as a fraction of the heating time.

11. The apparatus according to claim 1, wherein the packaging machine comprises a sealing station and the recipe generator includes a rule for determining a sealing temperature as one of the one or more recipe variables for producing a sealing seam, wherein the recipe generator uses the rule to determine the sealing temperature based on a film thickness of two or more film sections to be sealed.

12. The apparatus according to claim 11, wherein the recipe generator comprises a second rule for determining a sealing force as another one of the one or more recipe variables for producing the sealing seam, wherein the recipe generator uses the second rule to calculate the sealing force in consideration of a sealing pressure applicable at the sealing station and a sealing surface to be generated.

13. A method for generating one or more specific process parameter based on a recipe data set for an adjustment process of a packaging machine, wherein a recipe generator is one of (a) a part of the packaging machine, or (b) is a separate unit that is functionally connected to the packaging machine, the method comprising the steps of:

generating one or more recipe variables of the recipe data set using a first set of rules formed in the recipe generator for the adjustment process of the packaging machine with reference to a plurality of data, the plurality of data comprising data relating to at least one or more of: a product to be packaged, two or more tools of the packaging machine, or a label to be applied;

generating one or more process parameter from the recipe data set using a process parameter generator of the packaging machine for the adjustment process of the packaging machine, preallocating a control unit for a production process on the packaging machine using at least partially the one or more process parameter;

autonomously producing the one or more recipe variables using the recipe generator without being integrated into a process-related control circuit of the production process by calculating the recipe variables independent of a control system of an actual production process; and adapting the one or more process parameter using a second set of rules formed in the process parameter generator depending on two or more tool components of the packaging machine for generating the one or more specific process parameter.

* * * * *